(12) United States Patent
Nakahira

(10) Patent No.: US 8,433,788 B2
(45) Date of Patent: Apr. 30, 2013

(54) OVERLAY NETWORK TRAFFIC DETECTION, MONITORING, AND CONTROL

(75) Inventor: Yoshihiro Nakahira, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 407 days.

(21) Appl. No.: 12/656,135

(22) Filed: Jan. 19, 2010

(65) Prior Publication Data

US 2010/0185760 A1 Jul. 22, 2010

(30) Foreign Application Priority Data

Jan. 20, 2009 (JP) .................................. 2009-010074

(51) Int. Cl.
*G06F 15/173* (2006.01)

(52) U.S. Cl.
USPC ............ 709/224; 709/205; 709/223; 709/235

(58) Field of Classification Search .................. 709/224, 709/205, 223, 235
See application file for complete search history.

(56) References Cited

U.S. PATENT DOCUMENTS

| 7,590,715 | B1 * | 9/2009 | Raanan .......................... 709/223 |
| 7,600,033 | B2 * | 10/2009 | Bauer et al. .................... 709/232 |
| 7,697,418 | B2 * | 4/2010 | Rabinovitch .................. 370/218 |
| 8,117,657 | B1 * | 2/2012 | Elrod et al. ....................... 726/23 |
| 2002/0174221 | A1 * | 11/2002 | Maxwell et al. .............. 709/224 |
| 2005/0169193 | A1 * | 8/2005 | Black et al. .................... 370/254 |
| 2009/0040924 | A1 * | 2/2009 | Evans ............................. 370/230 |
| 2010/0043047 | A1 * | 2/2010 | Archer et al. ...................... 726/1 |

FOREIGN PATENT DOCUMENTS

| JP | 2004-343186 A | 12/2004 |
| JP | 2005-202589 A | 7/2005 |
| JP | 2005-278176 A | 10/2005 |
| JP | 2006-506877 | 2/2006 |
| JP | 2007-019949 A | 1/2007 |
| JP | 2008-113186 A | 5/2008 |
| JP | 2009-049458 A | 3/2009 |

* cited by examiner

*Primary Examiner* — Nicholas Taylor
(74) *Attorney, Agent, or Firm* — Rabin & Berdo, P.C.

(57) ABSTRACT

An overlay network traffic detection system deploys traffic measurement units at multiple points on a network, creates profiles of the network traffic measured at each point, and then compiles the traffic profiles obtained at different points. The compiled profile of outbound traffic originating at a node is compared with the compiled profile of inbound traffic addressed to the same node. A strong correlation between the two profiles indicates that the node is relaying overlay network traffic. Further information can be gained by profile screening, by active interference in the traffic flow, by launching known information into the network at known times and observing its effect on the traffic profiles, and by observing keyword distributions in non-encrypted traffic.

10 Claims, 10 Drawing Sheets

US 8,433,788 B2

OVERLAY NETWORK TRAFFIC DETECTION, MONITORING, AND CONTROL

BACKGROUND OF THE INVENTION

1. Field of the Invention

The present invention relates to the detection, monitoring, and control of overlay network traffic, including peer-to-peer network traffic.

2. Description of the Related Art

Much of the traffic that flows on, for example, the Internet is encrypted. Much traffic also flows through peer-to-peer (P2P) networks and overlay networks, in which transmission paths that operate as virtual tunnels are established between user nodes that operate as relay points.

The term 'overlay network' means a network structured on an underlying network and using the underlying network's data transmission function, but having a routing function differing from that of the underlying network. The term 'peer-to-peer network' refers to a network of computers that interact on a peer basis. In a peer-to-peer network of personal computers (PCs), for example, each personal computer performs the same network functions, operating sometimes as a terminal node and sometimes as a relay node. Many wide area peer-to-peer networks are implemented as overlay networks on the Internet.

Peer-to-peer networks and other types of overlay networks may use up a large amount of the underlying network's bandwidth, thereby blocking other users' communication, or may conduct illegal activities such as transmitting illegal information or offering illegal services. It is therefore sometimes necessary to obtain information about the activities of overlay and peer-to-peer networks.

Organizations and persons that need to discover the existence of overlay networks and obtain information about them include law enforcement agencies, for crime deterrence and investigation; government ministries, for supervision of telecommunications business; carriers providing communication services; general users who want to eliminate malicious overlay network software, if it has been installed on their computers without their knowledge; copyright holders and holders of other legal rights in the content transmitted or offered on overlay networks; etc.

The type of information that needs to be obtained about an overlay network includes, for example, the presence of encrypted or tunneled traffic, the communication paths of the traffic, the volume of the traffic, and the communication protocols used, but such information can be difficult to obtain. In fact, it can be difficult to discover even the existence of overlay networks.

One reason for these difficulties is that the length and content of packets may be modified at the nodes of an overlay network, as illustrated in FIG. 1, making it difficult for an Internet service provider (ISP) to assess the packet flow.

In the example shown in FIG. 1, a single packet contains data belonging to different streams and destined to different nodes in the overlay network. An overlay node receiving such packets modifies them by shuffling their contents and transmits the modified packets onward toward the appropriate destinations in the overlay network.

In FIG. 1, packet 101, addressed to personal computer PC50, and packet 102, addressed to personal computer PC60, are transmitted from router R10 to an ISP's router R41. Unknown to the ISP, packet 101 includes data to be transferred from personal computer PC50 to router R20 and personal computer PC60, and packet 102 includes data to be transferred from personal computer PC60 to other destinations (not shown) via routers R20 and R30.

Similarly, packet 201, addressed to personal computer PC50, and packet 202, addressed to personal computer PC60, are transmitted from router R20 to the ISP's router R42, and packet 301, addressed to personal computer PC50, is transmitted from router R30 to the ISP's router R43. These packets include data to be transferred to routers R10 and R30 and personal computers PC50 and PC60. Routers R10, R20, and R30 belong to other ISPs.

When these packets reach personal computers PC50 and PC60, which are nodes on the overlay network, their internal data are recombined according to their next destinations and the recombined data are transmitted back to the ISP as packets 510 to 540 and 610 to 630. Because of the flow separation and integration performed at the nodes PC50, PC60 of the overlay network, by analyzing just the packet traffic it is difficult for the ISP to learn of the existence of the overlay network and determine what type of traffic it is carrying.

To some extent, these problems are addressed by the known art.

Japanese Patent Application Publication (JP) No. 2004-343186 (now Japanese patent No. 3698707) discloses various methods of recognizing peer-to-peer traffic, including: a method that separates peer-to-peer traffic by analysis of its address information (claim 1); a method that involves joining a peer-to-peer service to obtain such address information (claim 2); a function for separating traffic having matching address information (claim 3); improved variations of these methods (claims 4 to 7); and a method that includes analyzing the time stamp, outgoing Internet protocol (IP) address, incoming IP address, outgoing port number, incoming port number and packet size of each packet (claim 8).

In particular, JP 2004-343186 teaches installing a traffic separator to observe traffic in a network as shown in FIG. 2. IP addresses of peer-to-peer nodes are obtained by a decoy terminal connected to the peer-to-peer network and are forwarded to the traffic separator, which manages the peer-to-peer traffic and regular network traffic in separate internal databases (not shown).

One problem with the methods disclosed in JP 2004-343186 is that the information obtained by the traffic separator is limited to information held by nodes that have made contact with the decoy terminal and information about the flow of traffic transmitted and received by such nodes; the traffic separator cannot obtain information about other nodes in the peer-to-peer network. Another problem is that no method of specifically blocking peer-to-peer network traffic without blocking other traffic handled by the peer-to-peer network nodes is provided.

JP 2005-202589 discloses a method in which peer-to-peer node information is obtained by a dummy personal computer to discover peer-to-peer traffic. This method, however, requires knowledge that a peer-to-peer network is deployed on the underlying network and knowledge of the personal computers functioning as peer-to-peer nodes and their IP addresses. The dummy personal computer must also be able to join the peer-to-peer network freely. Accordingly, this method fails to identify peer-to-peer traffic if the personal computers belonging to the peer-to-peer network are unknown, or if authentication is necessary to join the peer-to-peer network.

JP 2005-278176 discloses a network management method in which information related to network connectivity, including samples of user activities, is received and analyzed to construct a parameter-based statistical model that predicts the connectivity between different network areas. Network operation is then simulated under various parameter values, to evaluate network traffic (claim 1). Claim 4 and claims 6 to 10 apply this method to the management of peer-to-peer networks. A problem in this method is the reliability of the statistical model. How to construct an adequately reliable statistical model remains an open question.

JP 2006-506877 discloses a network traffic control method in which peer-to-peer messages are detected by a third party who is free to obtain the content of the peer-to-peer messages. This method is inapplicable when it is difficult to detect peer-to-peer messages, or when their content is encrypted and cannot be decrypted.

JP 2007-019949 discloses a network traffic reduction system that assumes that specific content can be recognized in network traffic. This method is inapplicable when specific content cannot be recognized.

JP 2008-113186 discloses a method for implementing an overlay network to provide network flow with a desired quality of service. This method includes the use of a measurement cost index to control the measurement load involved in obtaining accurate measurements of quality. A precondition for this method is that the network operator can detect and control flow paths, however, so this method is inapplicable when users implement an overlay network on their own.

The present applicant has filed a Japanese patent application (application No. 2007-210866, published as JP 2009-49458) for a system for detecting overlay and peer-to-peer network traffic at a particular node by comparing its inbound and outbound traffic, but there is still an unmet need for an overlay traffic detection system and a traffic monitoring and control system that can discover the existence of an unknown overlay network, and can proceed to identify the overlay network nodes, detect of the volume of overlay network traffic and the communication paths used, and discover the protocol used on the overlay network.

SUMMARY OF THE INVENTION

The present invention provides an overlay network traffic detection system having a plurality of traffic measurement units deployed on a network to obtain statistical information about traffic flow on the network at a plurality of points.

A plurality of traffic profilers create traffic profiles based on the statistical information measured at the respective points.

A correlator-evaluator-thresholder collects and additively compiles the traffic profiles obtained at the different points, and calculates a correlation level between the compiled profile of traffic inbound to a node in the network, the node being the destination of the inbound traffic, and the compiled profile of outbound traffic originating from that node. The correlation level is compared with a threshold to decide whether the node is relaying overlay network traffic.

The traffic profiles may indicate temporal variations in or statistical features of the statistical information, or both. The correlation may be calculated from a frequency component analysis of the inbound and outbound traffic.

When the traffic profiles are compiled, profiles of selected traffic flows may be selectively screened out to narrow the compiled profiles down to suspected overlay network traffic.

Artifacts such as packet delays, dropped packets, or bit errors may be added to the network traffic and the resulting effects on the traffic profiles may be observed to identify overlay network traffic paths.

A decoy node may launch information into a known overlay network and the flow of this information may be observed by comparing traffic profiles before, during, and after the launching of the information.

By compiling traffic profiles from different points in the network, the overlay network traffic detection system can construct comprehensive profiles of a node's inbound and outbound network traffic. An overlay network node that relays overlay network traffic tends to show similar inbound and outbound traffic patterns, by which the node can be identified. Similar traffic patterns at different points in the network can then be used to trace the flows of overlay network traffic, and once the overlay network traffic is identified, its volume and protocol can be determined.

DETAILED DESCRIPTION OF THE INVENTION

Figure 1:
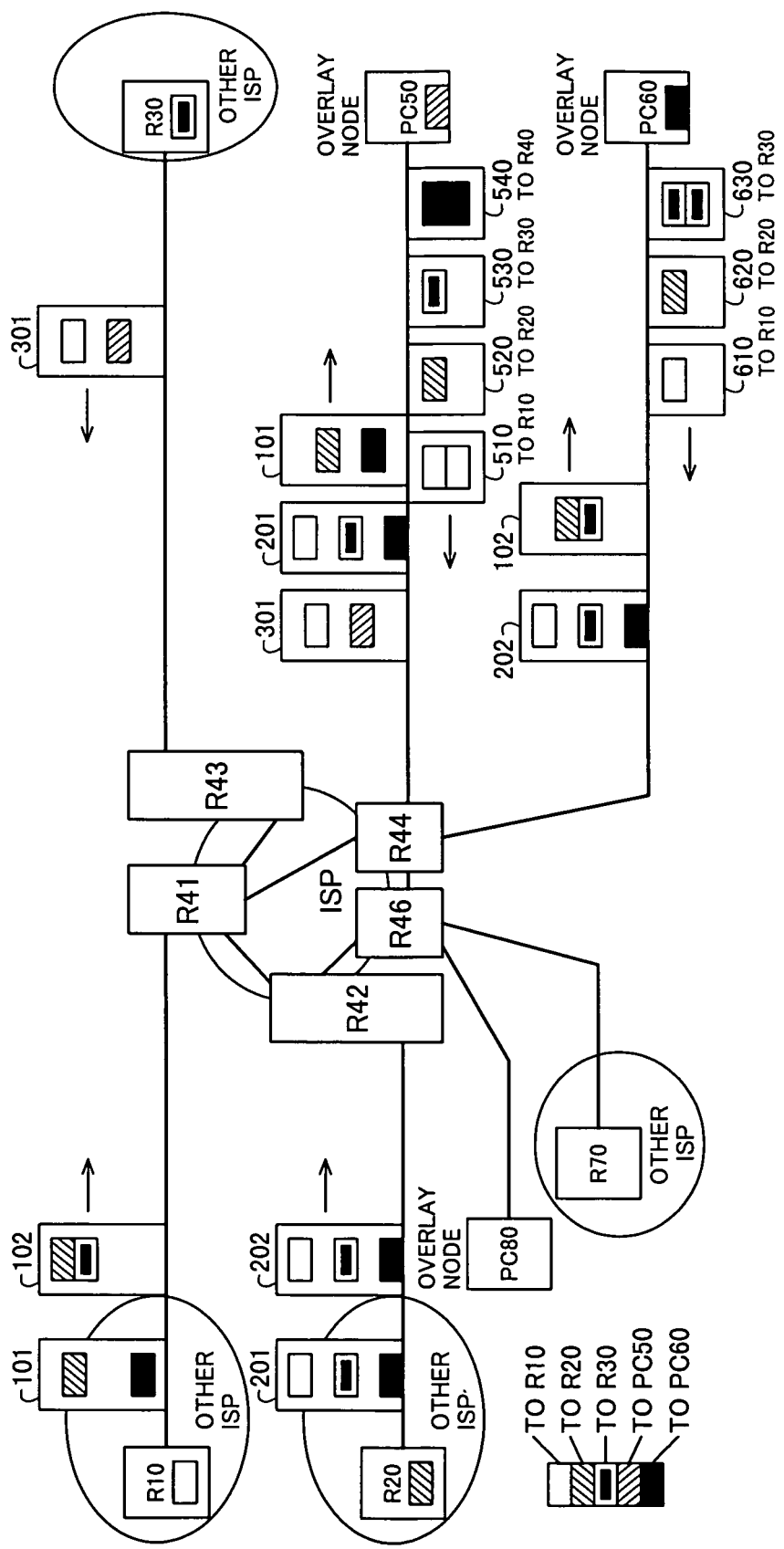
FIG. 1 is a schematic diagram illustrating overlay traffic in a conventional network.
Figure 2:
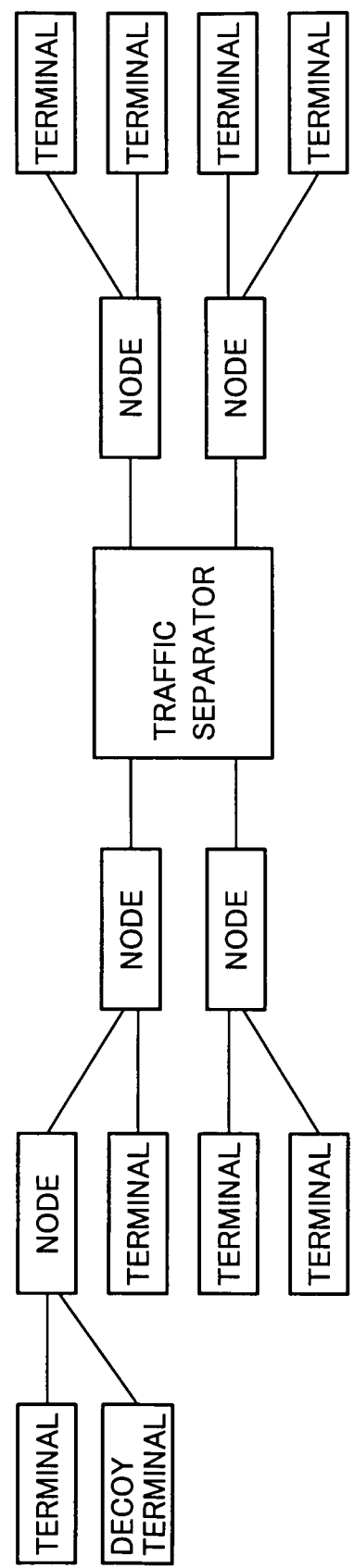
FIG. 2 is a network diagram illustrating a conventional method of dealing with overlay network traffic.

Embodiments of the invention will now be described with reference to the attached drawings, in which like elements are indicated by like reference characters.

First Embodiment

Figure 3:
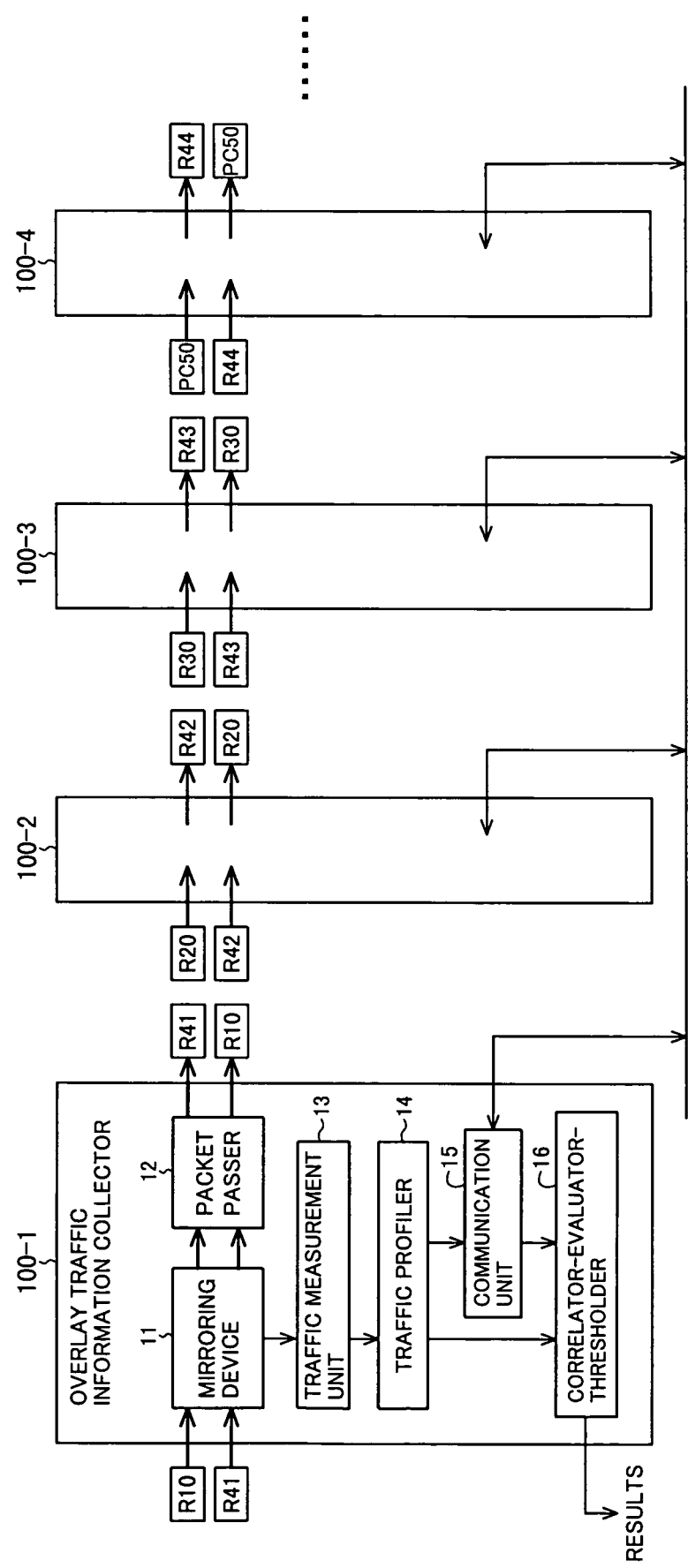
FIG. 3 is a block diagram illustrating the general plan of the overlay traffic detection system and the internal structure of one of its overlay traffic information collectors in a first embodiment of the invention.

The equipment in the first embodiment includes a plurality of overlay traffic information collectors 100-1, 100-2, 100-3, 100-4, . . . as shown in FIG. 3. A general one of these overlay traffic information collectors 100-1, 100-2, 100-3, 100-4, . . . will be referred to as an overlay traffic information collector 100. Each of these overlay traffic information collectors 100 may be mounted in or on a router, for example, or in a personal computer belonging to a cooperating subscriber, to receive traffic in transit on a network.

Figure 4:
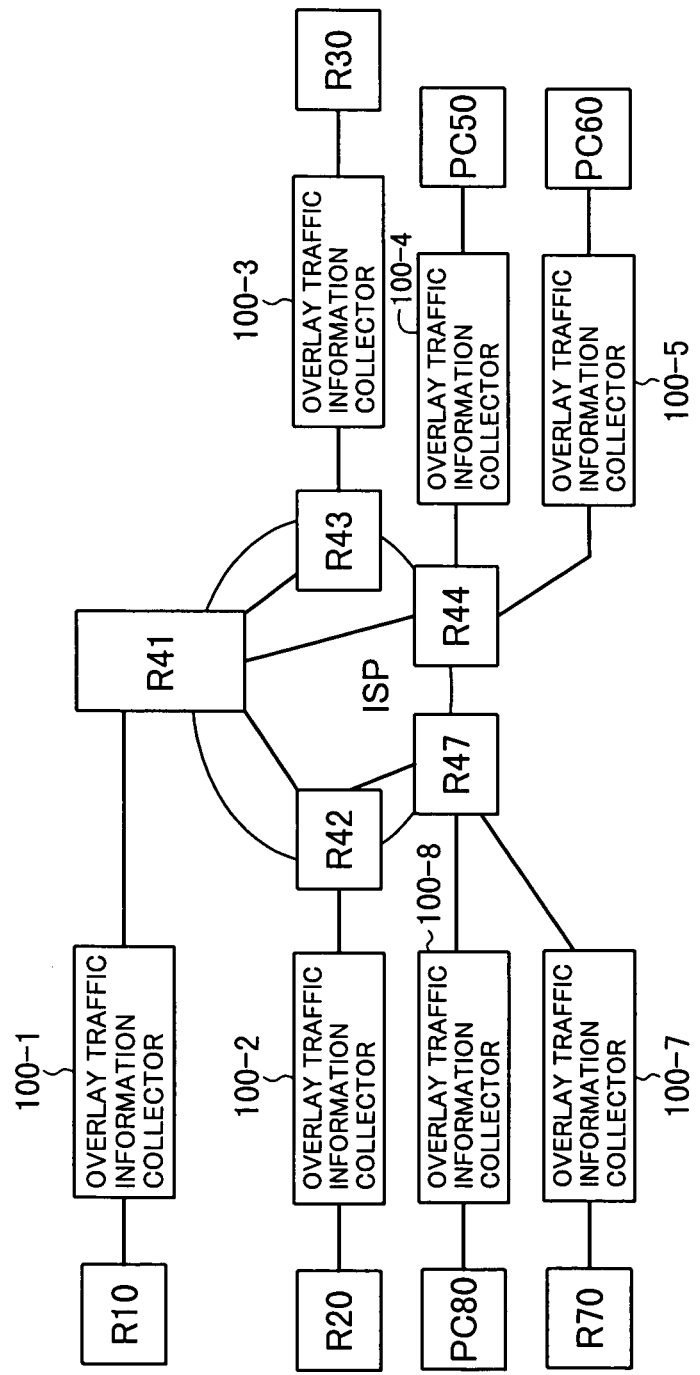
FIG. 4 is a diagram illustrating an exemplary deployment of overlay traffic information collectors in a network in the first embodiment.

FIG. 4 shows overlay traffic information collectors 100-1, . . . , 100-5, 100-7, 100-8 installed in the network that was shown in FIG. 1. Each overlay traffic information collector is preferably located between two routers belonging to different ISP networks or between a router belonging to an ISP network and a subscriber's personal computer. Overlay traffic information collector 100-1, positioned between routers R41 and R10, is an example of the former type of location; overlay traffic information collector 100-8 in FIG. 4, positioned between router R47 and personal computer PC80, is an example of the latter type of location. It is not necessary to install overlay traffic information collectors at all possible locations of these types. If necessary, overlay traffic information collectors may also be installed on internal ISP network lines.

Overlay traffic information collector 100-1 in FIG. 3 includes a mirroring device 11, a packet passer 12, a traffic measurement unit 13, a traffic profiler 14, a communication unit 15, and a correlator-evaluator-thresholder 16. The other overlay traffic information collectors 100-2, 100-3, . . . include at least the traffic measurement unit 13, traffic profiler 14, and communication unit 15, and in general the mirroring device 11 and packet passer 12 as well, but do not necessarily include a correlator-evaluator-thresholder 16.

The mirroring device 11, receives inbound traffic, makes two copies of each input packet, gives one copy to the packet passer 12, and gives the other copy to the traffic measurement unit 13. Instead of a copy of every packet, the traffic measurement unit 13 may be given only a sampling of the packet traffic, but sampling lowers the overlay network detection accuracy, so it is preferable for the traffic measurement unit 13 to receive copies of all traffic input to the overlay traffic information collector 100-1.

The mirroring device 11 may be omitted if the packet passer 12 and traffic measurement unit 13 can receive packets directly through router or transmission paths. In wireless local area networks (LANs) and other wireless networks, for example, the mirroring device is unnecessary if the packet passer 12 and traffic measurement unit 13 can receive signals propagating through space.

The packet passer 12 may simply output the packets it receives so that the packet traffic passes through the overlay traffic information collector 100-1 undisturbed, or the packet passer 12 may selectively delay packets, selectively drop packets, selectively corrupt packet data by generating bit errors, or perform a combination of some or all of these processes. The packets to be delayed, dropped, or corrupted can be selected on the basis of their source address or destination address, or both the source and destination addresses. Different delays or bit errors may be added for different sources and/or destinations. If none of these processes will be carried out, the packet passer 12 may be omitted.

The traffic measurement unit 13 extracts information necessary to determine whether inbound traffic is overlay network traffic or not and outputs the extracted information to the traffic profiler 14. The extracted information may include the arrival time, length, source and destination IP addresses, port number, protocol number, sequence number, presence or absence of errors, and other inbound traffic information.

Based on the information received from the traffic measurement unit 13, the traffic profiler 14 creates a traffic profile and stores it in a file. The file may be organized as, for example, a matrix of IP addresses or network addresses with source addresses on the vertical (or horizontal) axis and destination addresses on the horizontal (or vertical) axis, and information such as packet length, traffic volume, protocol, and arrival intervals filed cumulatively, together with the observation time, in the matrix.

As described below, the correlator-evaluator-thresholder 16 may perform a frequency component analysis to evaluate traffic flows and identify overlay network traffic. In this case the traffic profiler 14 may perform preprocessing for the frequency component analysis and the profile may include statistical traffic characteristics, such as traffic data analyzed into frequency components.

The communication unit 15 has the function of communicating with the communication units of the other overlay traffic information collectors 100-2, 100-3, 100-4, . . . by, for example, transmitting and receiving traffic profiles.

The correlator-evaluator-thresholder 16 compiles the traffic profiles created by the traffic profiler 14 of its own overlay traffic information collector and the traffic profilers 14 of the other overlay traffic information collectors 100-2, 100-3, 100-4, . . . , evaluates the correlations or other effects that appear when there is overlay network traffic, compares resulting values with corresponding threshold values, and outputs the comparison results. An evaluation that produces a value equal to or greater than the corresponding threshold value indicates overlay network traffic; a value less than the threshold value indicates ordinary traffic.

Although a plurality of traffic measurement units 13 must be used, they need not be installed on all transmission paths. For example, not all of the paths shown in FIG. 4 have to be populated by overlay traffic information collectors, and not all of the overlay traffic information collectors 100 need to have all of the components of overlay traffic information collector 100-1 shown in FIG. 3. In particular, there may be a correlator-evaluator-thresholder 16 in only one overlay traffic information collector.

The correlator-evaluator-thresholder 16 in the first embodiment obtains the profiles of the traffic observed at the other overlay traffic information collectors 100-2, . . . , 100-5, 100-7, 100-8 by communicating with the overlay traffic information collectors 100-2, . . . , 100-5, 100-7, 100-8 through the communication unit 15 and uses the profiles to evaluate the correlations and effects seen when there is overlay network traffic.

Figure 5:
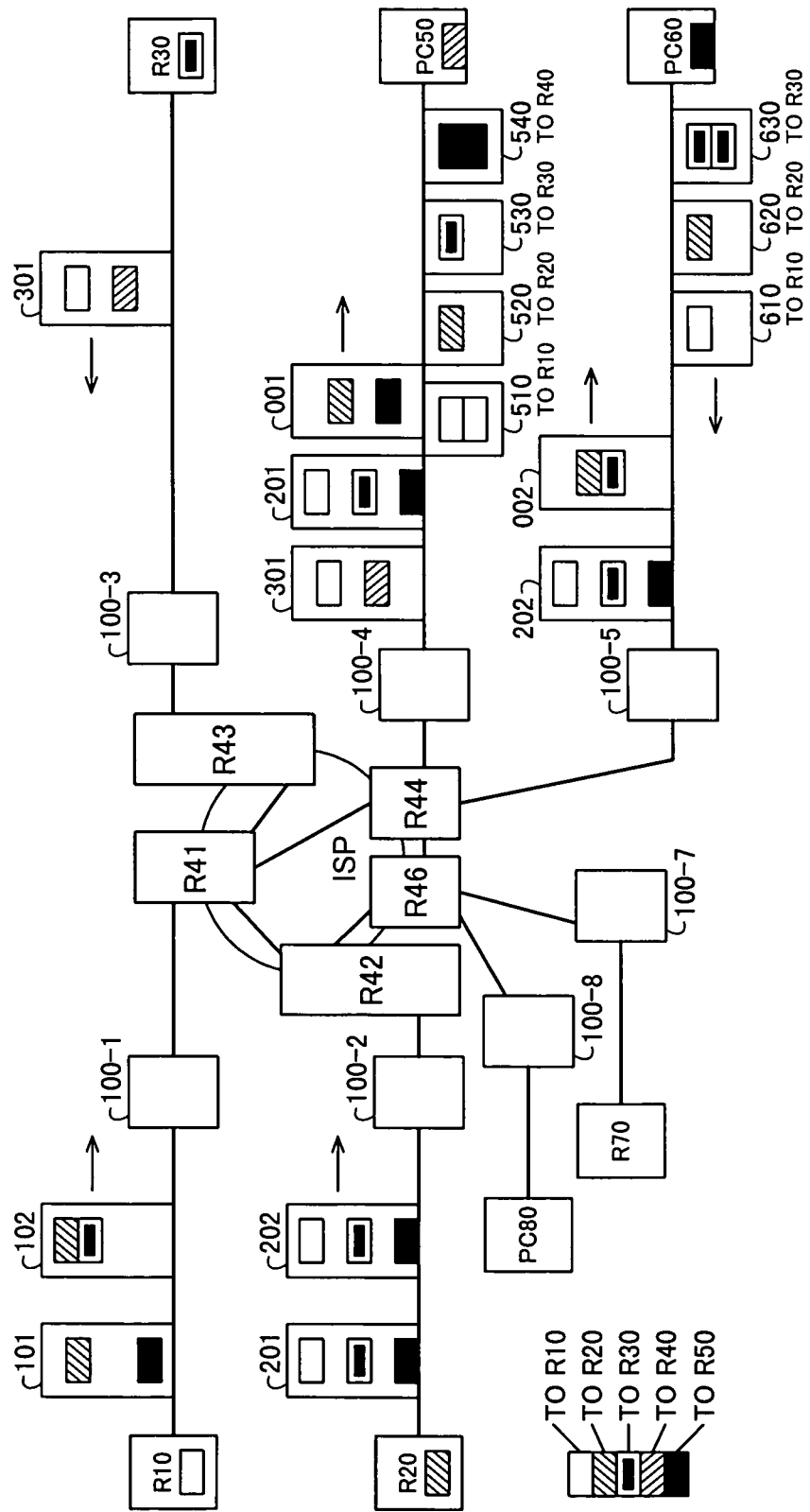
FIG. 5 illustrates overlay traffic in the network in FIG. 4.

FIG. 5 shows the same flow of overlay network traffic that was shown in FIG. 1. The difference between FIGS. 1 and 5 is that in FIG. 5, each packet passes through at least one overlay traffic information collector. The overlay traffic information collectors profile the traffic flowing into and out of each node in a way that makes it possible to determine, with high accuracy, which nodes are overlay network nodes and what the transmission paths, traffic volume, and other properties of the overlay network are, despite the reshuffling of packet contents at the overlay network nodes, and even if overlay network traffic is encrypted in a way that makes it impossible to distinguish different streams by examining the packet contents.

The method described by the present applicant in JP 2009-49458 evaluates the strength of correlation between the profile of traffic input to one interface in a network and the profile of traffic output from another interface in the network. The first embodiment of the present invention extends this method by additively compiling traffic profiles observed by a plurality of overlay traffic information collectors, taking statistics, measuring correlations between the compiled traffic profiles, each of which is obtained from a plurality of interfaces, and thereby detecting the presence or absence of overlay network traffic and its transmission paths, nodes, traffic volume, and so on, by one or combination of the methods described below.

The correlator-evaluator-thresholder 16 evaluates correlations among inbound and outbound traffic profiles observed at a plurality of interfaces. The observations may include, for example, inbound traffic at one interface IF-A and outbound traffic at a plurality of interfaces IF-B, IF-C, IF-D, . . . , or inbound traffic at a plurality of interfaces IF-A, IF-B, IF-C, . . . and outbound traffic at one interface IF-D, or inbound traffic at a plurality of interfaces IF-A, IF-B, IF-C and outbound traffic of a plurality of interfaces IF-D, IF-E, IF-F, . . . , where inbound and outbound are with respect to the ISP and IF-A, IF-B, . . . represent the locations of arbitrary ones of the overlay traffic information collectors.

For example, the correlator-evaluator-thresholder 16 may evaluate the correlation between the time series data (time series profile) of inbound traffic observed at a plurality of interfaces but having the same IP address as a destination address and the time series data (time series profile) of outbound traffic observed at a plurality of interfaces and having this same IP address as a source address.

The observed traffic may include both overlay network traffic and other types of network traffic. Even though the contents of the packets constituting the overlay network traffic are reshuffled at overlay network relay nodes and the lengths of the packets may change, a node that is relaying overlay network traffic can generally be recognized by a similarity between its total inbound and outbound traffic patterns, observed at a plurality of interfaces, and traffic having similar inbound and outbound patterns at an overlay network node can be recognized as overlay network traffic.

The correlator-evaluator-thresholder 16 in the overlay traffic information collector 100-1 therefore evaluates correlations among traffic profiles compiled from a plurality of interfaces, but in some cases the volume of traffic to be correlated becomes prohibitively large, and there are also cases in which, from the standpoint of detecting overlay network traffic, much of the observed traffic is 'noise' rather than 'signal'. In such cases, to reduce the correlation processing load, shorten the detection time, and sharpen the detection accuracy, traffic observations that appear unnecessary may be selectively screened out before the correlation evaluation process begins. There are various possible screening methods, corresponding to the various decision methods used by the overlay traffic information collector 100-1. Three exemplary methods will be described below.

In the first method, traffic is screened by the traffic measurement unit 13. The screening criteria may be based on the availability of computing resources, such as the processing capability of the central processing unit (CPU) of the overlay traffic information collector 100-1. The traffic to be screened out is determined in advance, and the traffic measurement unit 13 does not take any measurement data for the screened-out traffic.

In the second method, traffic is screened by the traffic profiler 14. The traffic to be screened out is determined before the traffic profiler 14 profiles the traffic, and the traffic profiler 14 omits the traffic to be screened out from the traffic profiles it creates.

For example, when the correlator-evaluator-thresholder 16 performs a frequency component analysis based on the traffic profile information, as preprocessing for the frequency component analysis, the traffic profiler 14 may compare information provided by the traffic measurement unit 13 about the traffic addressed to a predetermined destination node with the information about traffic originating from the same node, select the traffic information that shows a high correlation, and create a profile based on that traffic information, screening out other less correlated traffic.

In the third method, traffic is screened by the correlator-evaluator-thresholder 16. The correlator-evaluator-thresholder 16 decides what data are to be screened out, and removes those data from the profiles it collects from the traffic profiler 14 in overlay traffic information collector 100-1 and the traffic profilers 14 at other overlay traffic information collectors.

Any one or any combination of these three methods may be used.

Regardless of the method use, the object is to screen out traffic that is unlikely to be overlay network traffic. Such screening is possible because of two basic differences between overlay network traffic and other traffic, such as ordinary Internet communication traffic. One difference is that in overlay network traffic, the inbound traffic volume at a user node tends to be substantially the same as the outbound traffic volume at the same node, while in other network traffic there tends to be a great difference between the inbound and outbound volumes at a user node. Another difference is that inbound overlay network traffic at a user node is often accompanied by outbound traffic from the same node, while in ordinary network traffic, a user node seldom has simultaneous inbound and outbound traffic.

Therefore, one basic screening policy is to compare the volume of traffic addressed to a user node, as determined from the destination addresses of the packets, with the volume of traffic originating from the same node, as determined from the source address of the packets, and screen the traffic out if the difference between these two volumes, or the ratio between them, exceeds a predetermined threshold value.

Another possible screening policy is to base profiles of traffic output from a user node on the traffic that occurs within a prescribed time of the occurrence of input traffic at the same node, and ignore traffic output after the elapse of the prescribed time.

The above screening conditions can shorten the overlay traffic detection process by singling out nodes that are likely to belong to overlay networks for more detailed analysis of their traffic.

Specific methods by which the correlator-evaluator-thresholder 16 can evaluate the correlations and other effects observable when overlay network traffic exists will now be described.

In one method, the correlator-evaluator-thresholder 16 in overlay traffic information collector 100-1 stores the traffic profiles measured by the overlay traffic information collectors at a plurality of interfaces, then adds up the stored profile data to obtain totaled traffic profiles and evaluates first-order correlations among the totaled traffic profiles. A correlation value equal to or greater than a threshold value is taken as indicating the presence of overlay network traffic; a correlation value less than the threshold value is taken as indicating the absence of overlay network traffic.

A node (such as node PC60 in FIGS. 4 and 5, for example) may be both an overlay network node and a regular network node, and its traffic may include both overlay network traffic and regular network traffic, so that input-output correlations between overlay network traffic are partially masked by other, uncorrelated traffic. In addition, the reshuffling of overlay packet content shown in FIG. 5 may conceal correlations of inbound and outbound packet length, and encryption may conceal correlations of packet content.

In order to address this problem, the correlator-evaluator-thresholder 16 detects the existence of an overlay network node by analyzing not only first-order correlations between its inbound and outbound traffic profiles but also time-series characteristics of the traffic. This enables the correlator-evaluator-thresholder 16 to detect overlay nodes despite reshuffling and encryption of their packet traffic, even if this produces differences between their inbound and outbound traffic profiles.

This time series analysis may be based on the assumption that, for example, the stream of overlay network traffic packets and the stream of regular network traffic packets have different frequency distribution characteristics.

To measure these characteristics, the correlator-evaluator-thresholder 16 divides a node's traffic profile data over a certain span of time into short time periods, analyzes the frequency components of the distributions of the traffic volumes in these short time periods, and looks for identical frequency components appearing in the node's inbound and outbound traffic.

For example, based on the profile data in these short time periods, the correlator-evaluator-thresholder 16 may construct a curved surface in an X-Y-Z Cartesian coordinate system in which X indicates time, Y indicates frequency, and Z indicates the magnitude of a given frequency component at a given time. The curved surface represents the envelope of the spectrum of the node's input or output traffic flow. By comparing the curved surfaces representing the inbound and outbound traffic of the node, the correlator-evaluator-thresholder 16 can identify matching frequency components that vary in the same way over time, an identify the corresponding components of the node's inbound and outbound traffic as possible overlay network traffic. If the number of matching components exceeds a threshold value, the node can be identified as an overlay network node; if the number of matching components is equal to or less than the threshold value, the node can be regarded, at least for the relevant span of time, as not being an overlay network node.

The correlator-evaluator-thresholder 16 may also perform a principal component analysis on the profile data and then evaluate the similarities and differences among the frequency components of the principal components of the inbound and outbound traffic.

The information on which this type of frequency component analysis is performed may include both packet lengths and packet arrival time spacing in the short time intervals. That is, the correlator-evaluator-thresholder 16 may analyze the frequency components of the packet length distribution and packet arrival time spacing distribution in the inbound traffic addressed to a particular destination node and the outbound traffic originating from the same node, measured over short time intervals.

The above methods may be used in a passive way, without altering the packet flow through the overlay traffic information collectors, or the packet passer 12 at a particular overlay traffic information collector may actively interfere with the packet flow to test the effects of such interference.

Examples of both active and passive operation of the overlay traffic information collectors will now be given.

First an example of the correlation of passively measured traffic profiles will be described. In this example, correlations are obtained by statistical processing of the traffic profiles obtained from all the overlay traffic information collectors 100-1, . . . , 100-5, 100-7, 100-8 without interference in the traffic flow by any of the packet passers 12. The overlay traffic information collectors 100-1, . . . , 100-5, 100-7, 100-8 all operate in the same way, so the description will focus on overlay traffic information collector 100-1.

Figure 6:
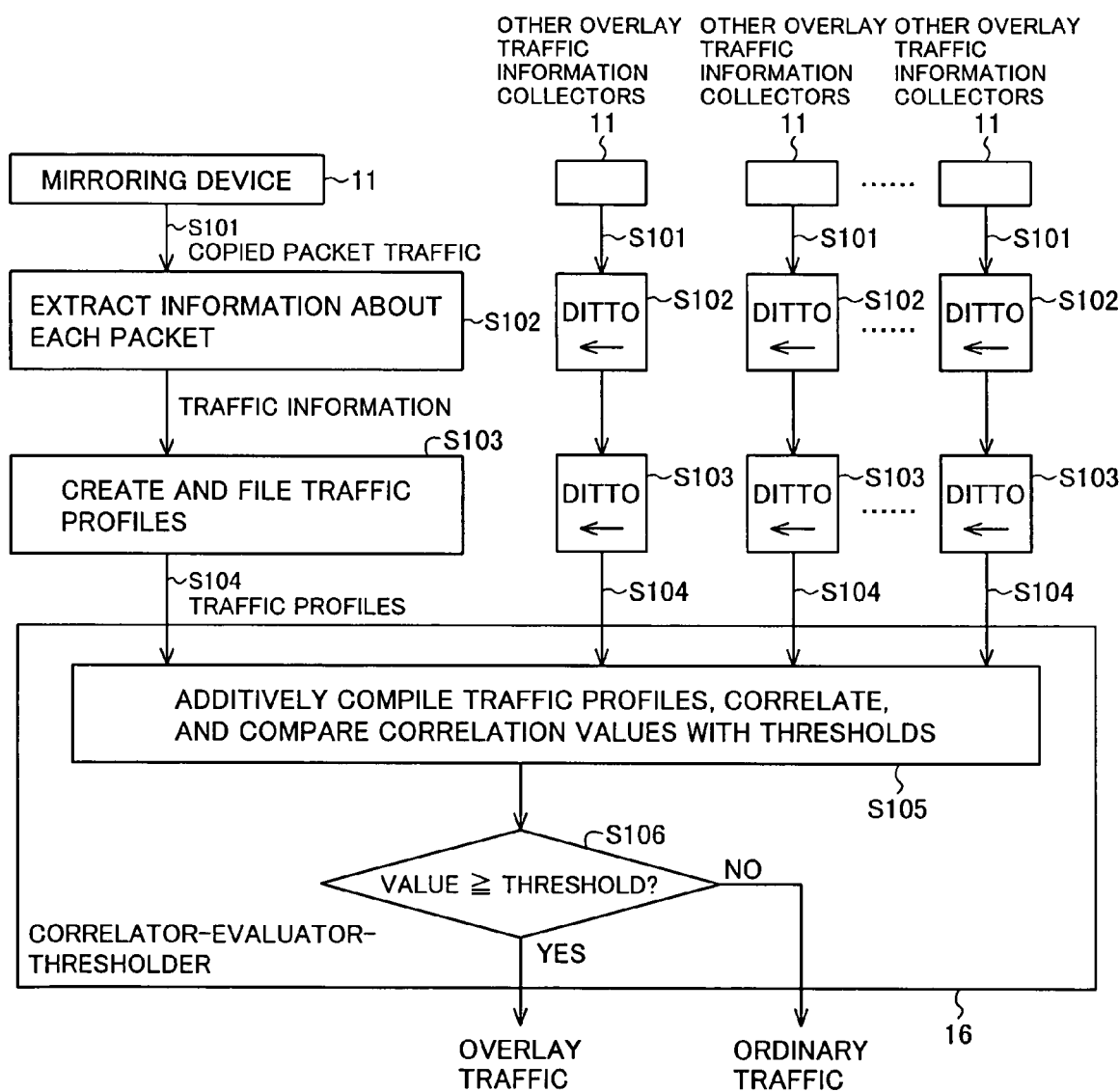
FIG. 6 is a flowchart illustrating overlay traffic detection by correlation of passive measurements in the first embodiment.

Referring to the flowchart in FIG. 6, the mirroring device 11 of the overlay traffic information collector 100-1 makes two copies of each packet (IP packet) entering overlay traffic information collector 100-1, passes one copy onward toward its destination through the packet passer 12, and gives the other copy to the traffic measurement unit 13 (step S101).

The traffic measurement unit 13 extracts information about the input packet, such as its arrival time, length, source and destination IP addresses, port number, protocol number, and sequence number, and the presence and absence of errors, and outputs this information to the traffic profiler 14 (step S102).

The traffic profiler 14 creates traffic profiles based on the information measured by the traffic measurement unit 13 and stores them in, for example, the matrix format described above in a file (step S103). At appropriate intervals, the file is transferred via the communication unit 15 to the other overlay traffic information collectors 100-2, . . . , 100-5, 100-7, 100-8. The communication unit 15 also receives profiles from overlay traffic information collectors 100-2, . . . , 100-5, 100-7, 100-8 (step S104).

The correlator-evaluator-thresholder 16 obtains the traffic profiles created by the traffic profiler 14 in its own overlay traffic information collector and the traffic profiles received from overlay traffic information collector 100-2 and the other overlay traffic information collectors, evaluates the correlations among the traffic profiles, and outputs the resulting values (step S105). More generally, the correlator-evaluator-thresholder 16 obtains the traffic profiles observed by all the overlay traffic information collectors 100 and evaluates their correlations or any other effects expected to appear when there is overlay network traffic. Each such evaluation produces a corresponding value.

The correlator-evaluator-thresholder 16 compares the values it obtains with corresponding threshold values, thereby deciding whether the measured traffic is overlay network traffic or not. An evaluation resulting in a value equal to or greater than the threshold value indicates overlay network traffic; a result value less than the threshold value indicates ordinary traffic.

To evaluate personal computer node PC60, for example, overlay traffic information collector 100-1 collects the traffic profiles of node PC60 measured by the traffic measurement units 13 and traffic profilers 14 of all the overlay traffic information collectors 100-1, . . . , 100-5, 100-7, 100-8, takes time-series statistics, and assesses correlations between the time-dependent profile of the traffic addressed to node PC60 as its packet destination and the time-dependent profile of the traffic output from node PC60 as its packet source.

If there is a correlation between the traffic profiles of the inbound and outbound traffic of node PC60 that exceeds the threshold value, the node is identified as an overlay network node that is relaying inbound traffic to other nodes.

The term 'correlation' as used herein is not restricted to the narrow mathematical sense of a statistical correlation function but also indicates the presence and absence of correlativity in the broad sense, measured by a correlation function or by other means. Examples of such other means will be given below.

If node PC60 is an overlay network node that also handles encrypted communication traffic as an ordinary network node, first-order correlations may be weakened by the encrypted traffic, so the correlator-evaluator-thresholder 16 also performs a frequency component analysis on the inbound and outbound traffic profiles of the node.

This analysis includes, for example, both a principal component analysis and the curved surface analysis described above, in which the correlator-evaluator-thresholder 16, in effect, plots a frequency distribution curve or spectrum on a plane parallel to the Y-Z coordinate plane for each of a succession of time values on the X-axis, constructs a three-dimensional envelope of the resulting curves, examines sections of the envelope surfaces in planes parallel to the X-Z plane, each section being the time-series profile of a single frequency component, and compares the number of matching frequency components of the envelope surfaces of the inbound and outbound traffic with a threshold value to decide whether the measured traffic includes an overlay network component.

The traffic profiler 14 in each overlay traffic information collector preferably preprocesses the profile data to create input data suitable for the frequency analysis.

The assumption behind this frequency component analysis is that there is a difference in frequency distribution between streams of overlay network traffic and streams of ordinary network traffic. When this assumption is true, frequency component analysis can reveal an overlay network node even if its absolute volumes of inbound and outbound traffic are quite different, due to the additional presence of large amounts of non-overlay network traffic.

When the above assumption is not true, the screening approach can be used to determine whether or not a large input-output difference in a measured quantity (traffic volume or some other quantity) is due to the absence of overlay network traffic. That is, the stream of measured traffic can be narrowed down by screening out selected traffic, to see if any of the telltale signs of overlay network traffic then appear. The screening can be carried out by the traffic measurement units 13, the traffic profilers 14, or the correlator-evaluator-thresholder 16, or any combination thereof, as noted above. If the node under analysis is really an overlay network node, then when screening by one or a combination of these screening methods excludes most or all of its non-overlay network traffic, a strong correlation will appear between the inbound and outbound traffic profiles, allowing the correlator-evaluator-thresholder 16 to recognize the node as an overlay network node. The same screening procedure also enables the correlator-evaluator-thresholder 16 to distinguish overlay network traffic from non-overlay network flow at the node.

Even if only part of the non-overlay traffic is screened out, this may be enough to reveal a prominent correlation peak that would otherwise be buried in noise.

Processing by the overlay traffic information collector 100-1 using active measurement of traffic profiles will now be described.

Active measurement refers to a process in which the packet passer 12 intentionally adds a delay or selective bit errors, or selectively drops packets, for particular sources and destinations, and measurement values are obtained by statistical processing of the resulting traffic profiles obtained from all the overlay traffic information collectors 100.

Figure 7:
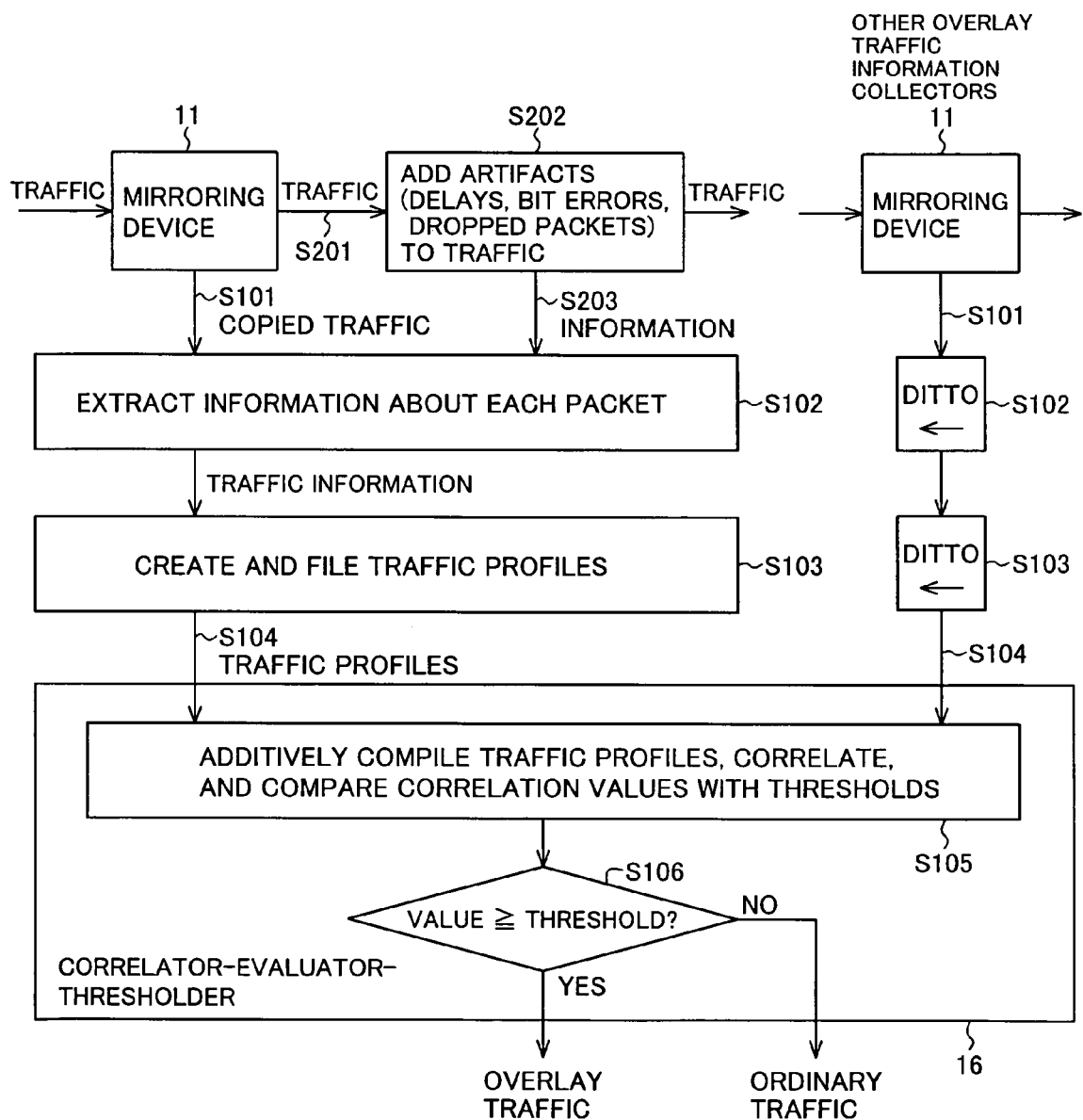
FIG. 7 is a flowchart illustrating overlay traffic detection by correlation of active measurements in the first embodiment.

Processing using correlations of active measurement values in the overlay traffic information collector 100 will be described with reference to the flowchart in FIG. 7. The overlay traffic information collectors 100 all operate in the same way so the description will focus on overlay traffic information collector 100-1.

Steps S101 to S106 are the same as in FIG. 6, so only the initial steps S201-S203 will be described in detail.

In step S201, two copies of a packet (IP packet) input to the overlay traffic information collector 100-1 are made in the mirroring device 11; one copy is supplied to the traffic measurement unit 13 and the other is supplied to the packet passer 12.

In step S202, the packet passer 12 adds a prescribed delay or prescribed bit errors to packets with specific destinations or sources, or drops prescribed packets with specific destinations or sources, and outputs the resulting packet stream.

The delaying or dropping of packets or adding of bit errors in step S202 may be performed in all or just some of the overlay traffic information collectors 100. Information identifying the delayed or dropped packets or bit errors is given to the traffic measurement unit 13 (step S203).

When receiving the traffic output from a node, the traffic measurement unit 13 measures the outbound traffic profile of the node (step S102). Then the correlator-evaluator-thresholder 16 observes the measured properties (traffic arrival intervals, traffic volume, etc.) of the flow, determines the effects of the added artifacts (delays, bit errors, or dropped packets) on these properties of the outbound flow, and thereby detects overlay network traffic (steps S103 to S106).

Even with normal encrypted transmission control protocol (TCP) traffic, if transmitted traffic is not acknowledged (no TCP-ACK replies are received), the transmitting side reduces the transmitted traffic volume, and eventually halts the flow of traffic. Therefore, when zero output flow time is measured, it is necessary to confirm that the lack of output is not due to TCP control.

More specifically, since zero output due to TCP control lasts longer than zero output due to packet dropping, zero output due to packet dropping can be detected by defining a threshold length of time and checking for zero output flow lasting for time periods shorter than the threshold length.

For example, if there is no change in outbound traffic volume despite the dropping of all traffic addressed to a node (for example, PC60), it can be concluded that the node is not acting as a relay node in an overlay network. If, however, the output flow from the node disappears for a length of time (shorter than the threshold) just after all traffic (or all traffic except traffic on known regular network paths) addressed to the node has been dropped, it can be concluded that the node is an overlay network node.

A method of investigating overlay network flow paths by active measurement will now be described.

In this method, to observe the path taken by a particular flow of traffic output from a node, the packet passers 12 in the overlay traffic information collectors 100 drop all other traffic output from that node. Alternately, the packet passers 12 leave the other traffic intact but add delays or bit errors to the targeted traffic flow. If the node is transmitting more than one suspected overlay network flow, this procedure is repeated for each flow in turn.

If the node is an overlay network node, this method can reveal the path of each flow relayed by and output from the node. When paths can be distinguished by their destination and/or source addresses, a plurality of flows output from a plurality of nodes may be evaluated simultaneously by this method.

To evaluate just one node (for example, node PC50), this method can be carried out by using only the packet passer 12 at overlay traffic information collector 100-4 to add delays or other artifacts to the inbound traffic originating at one or more selected source addresses and having node PC50 as its destination address, and observing the traffic output from node PC50. A necessary condition is that the source IP addresses of the inbound traffic have not been falsified.

In the first embodiment, observations are carried out at the input edge of the administered network and the overlay traffic information collectors 100 can identify the network from which each inbound traffic flow originates (the source of the flow). That is why, in the above example, the addition of delays or bit errors, or the dropping of packets, need only be performed by overlay traffic information collector 100-4.

In some cases the investigation time can be shortened by having the packet passer 12 first add delays or other artifacts to all outbound traffic from router R44, not just the traffic addressed to node PC50, to get a general idea of the combined effect of this action. If it appears that an effect may be present, the packet passer 12 can then gradually narrow down the investigation range to find the node that is producing the effect.

This invention addresses overlay network traffic and flow detection, but there may be cases in which the network operator wants to use the detected information to shut down or reshape specific overlay network traffic. This can be done by using a shaping apparatus or a router that has a shaping function. If installation of such apparatus would be prohibitively expensive, an equivalent function can be implemented by having the packet passer 12 drop packets.

There may also be cases in which the network operator wants to know whether the overlay network traffic is transmission control protocol (TCP) traffic or universal datagram protocol (UDP) traffic. Whether an overlay network uses the TCP protocol can be inferred by observing whether the traffic is suppressed by TCP flow control when delays are added to a specific traffic flow, or by detecting the exchange of short packets that may be a retransmission request and the requested retransmission.

As described above, even when nothing is known about an overlay network, the first embodiment enables the existence of the overlay network to be discovered and its nodes, flow volumes, paths, and network protocol to be identified, without use of dummy or decoy terminals, simply through the observation of the overlay network traffic by information collectors deployed on the underlying network.

This information can be obtained even when flows are aggregated and recombined at the overlay network nodes, because traffic profiles are collected from overlay traffic information collectors deployed at many points in the network and are additively compiled so as to give a total picture of the traffic flow at each node.

Even though the first embodiment is primarily intended to detect overlay network traffic and flows, it may also be used to shut down and reshape specific overlay network traffic by dropping packets, or by using routers with traffic shaping functions.

Second Embodiment

The overlay traffic detection, monitoring, and control system in the second embodiment of the invention will now be described.

Figure 8:
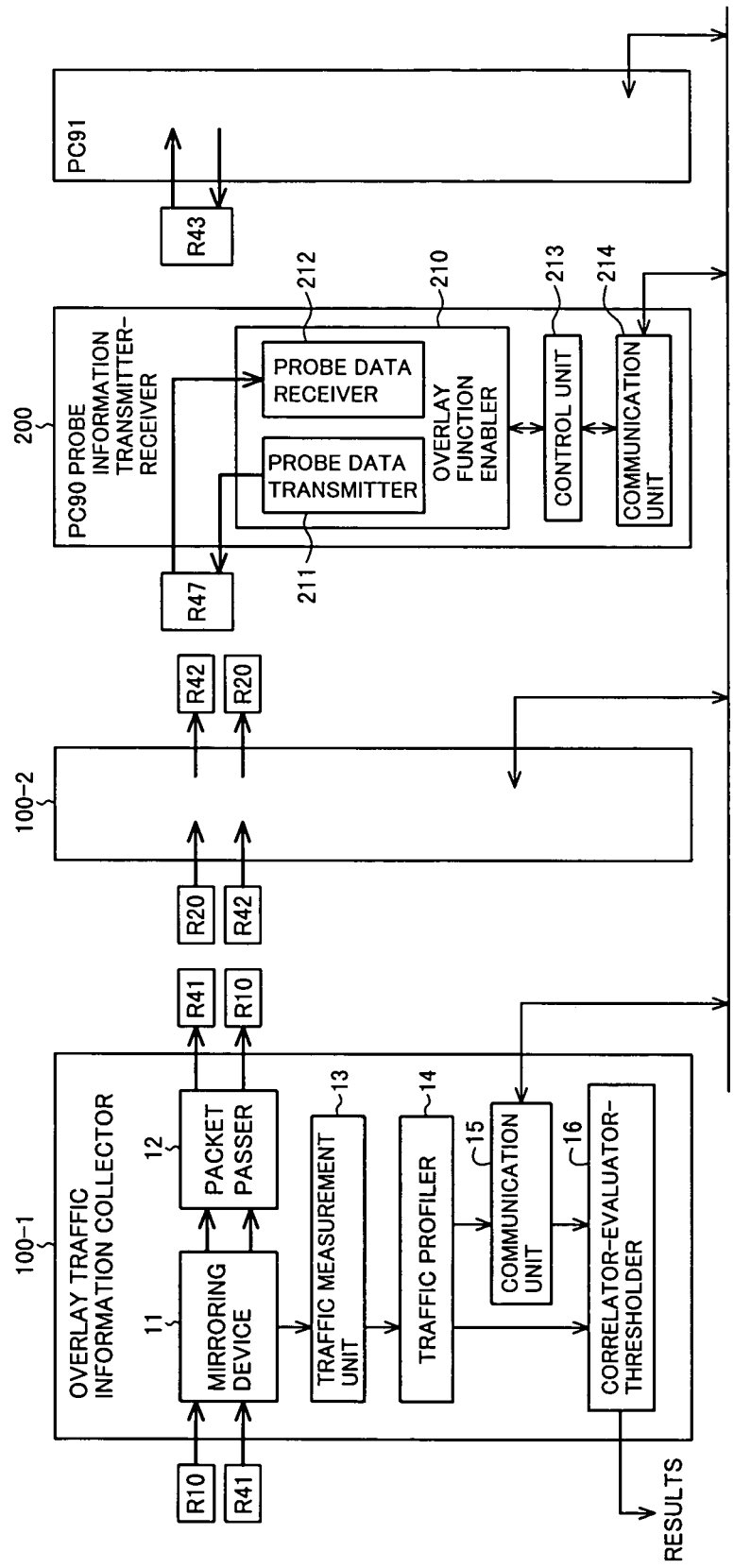
FIG. 8 is a block diagram illustrating the general plan of the overlay traffic detection system in a second embodiment and showing the internal structure of one of its overlay traffic information collectors and one of its probe information transmitter-receivers.

Referring to FIG. 8, in addition to the overlay traffic information collectors used in the first embodiment, the second embodiment employs a node including a probe information transmitter-receiver 200. The probe information transmitter-receiver 200 has an overlay function enabler 210, a control unit 213, and a communication unit 214.

The system in the second embodiment functions particularly effectively on file-sharing overlay networks. The node including the probe information transmitter-receiver 200 functions as a decoy in such networks, but differing from the prior art, the probe information transmitter-receiver 200 can produce information about overlay network nodes to which the decoy terminal is not directly connected, even about nodes with which the personal computer on which the probe information transmitter-receiver 200 is installed has no contact at all.

The communication unit 214 has the function of communicating with the overlay traffic information collectors 100-1 and 100-2, with other overlay traffic information collectors 100 (not shown), or with other probe information transmitter-receivers 200 (not shown). The communication unit 214 transmits information indicating, for example, whether probe information has been, is being, or will be transmitted.

The probe information is information of the type that would naturally be passed from node to node in the overlay network. In a file sharing network that employs shared folders, for example, the probe information may be information that the probe information transmitter-receiver 200 places in a shared folder. The nodes and paths of the overlay network can be traced by using the overlay traffic information collectors 100 to observe how the probe information propagates.

The control unit 213 controls the decoy functions used to investigate overlay network conditions. The control unit 213 communicates via the communication unit 214 with the overlay traffic information collectors 100 and other probe information transmitter-receivers 200 to transmit information such as probe information transmission status (pre-transmission, in transmission, or post-transmission).

The overlay function enabler 210 is the component that enables a node (e.g., personal computer PC90) to function as part of the overlay network. The overlay function enabler 210 includes a probe data transmitter 211 and a probe data receiver 212.

Procedures for detecting the existence of an overlay network and identifying its flow paths in the second embodiment will now be described.

The processing in the overlay traffic information collectors 100-1 and 100-2 is the same as in the first embodiment. Correlations of data obtained by both passive and active measurement may be used.

Figure 9:
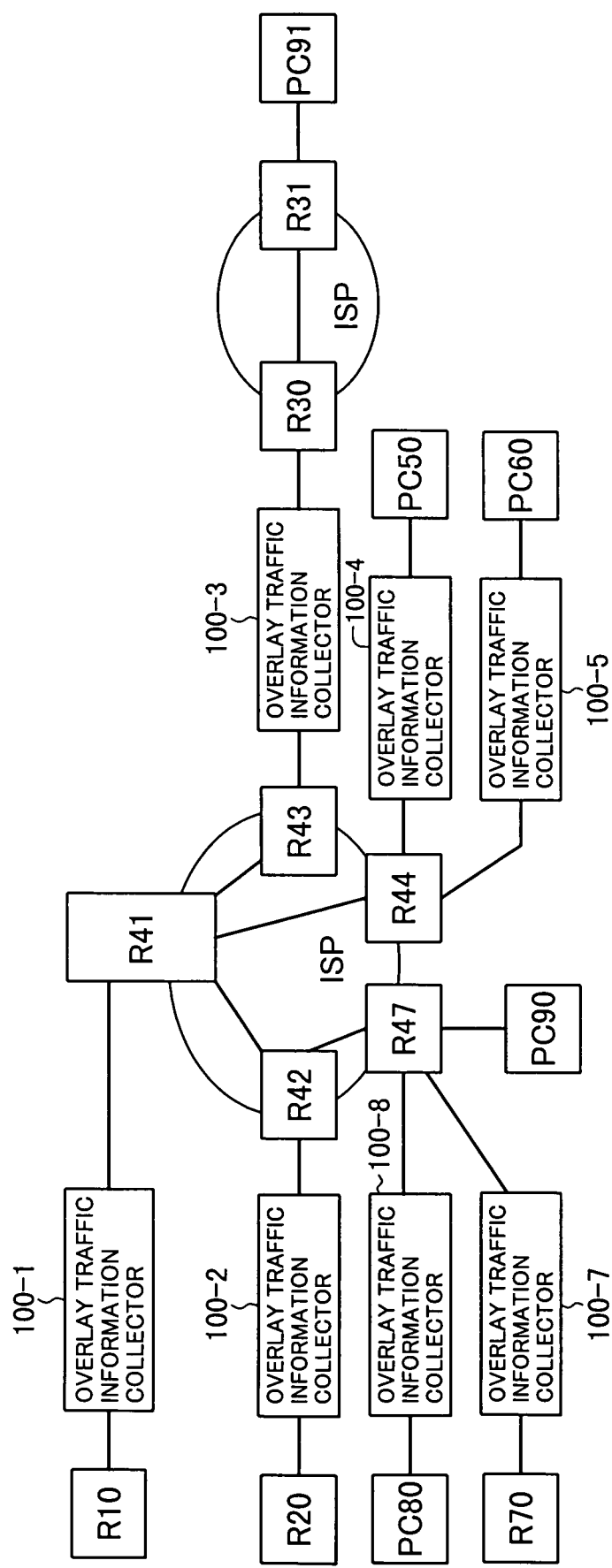
FIG. 9 is a diagram illustrating an exemplary deployment of overlay traffic information collectors and probe information transmitter-receivers in a network in the second embodiment.

Probe information transmitter-receivers 200 may be installed at nodes connected to different ISPs, as in FIG. 9, for example, in which probe information transmitter-receivers 200 are installed on personal computers PC90 and PC91. This deployment enables more extensive information to be obtained by having one probe information transmitter-receiver 200 receive the probe information that the other probe information transmitter-receiver 200 transmits. When personal computer PC90 places probe information in a shared folder, for example, personal computer PC91 may attempt to access the probe information, thereby drawing the information out through other nodes in the overlay network, such as, possibly, personal computer PC50 or PC60.

To observe overlay network activity, the overlay traffic information collectors 100-1, . . . , 100-5, 100-7, 100-8 observe the profiles of traffic originating at personal computer PC90 (source node) and arriving at personal computer PC91 (destination node) in the three probe information transmission states (pre-transmission, in-transmission, and post-transmission), determine their correlation relationships, and evaluate their effects. The correlation relationships and effect evaluations may be determined by using generally the same methods as described in the first embodiment.

That is, the overlay traffic information collectors 100-1, . . . , 100-5, 100-7, 100-8 obtain time-dependent information about the traffic volume, arrival intervals, port numbers, and protocols of the packets passed between each pair of destination and source IP addresses or network addresses when personal computer PC90 is in the pre-transmission, in-transmission, and post-transmission states, and evaluate the variations in this information over time.

More specifically, each overlay traffic information collector 100 measures traffic originating from personal computer PC90, for example, and creates a traffic profile indicating time series variations in traffic volume and destination IP address distribution. If there is a close correlation between the traffic profiles when PC90 is in the probe information pre-transmission state and the probe information post-transmission state but the traffic profile when PC90 is in the probe information in-transmission state differs from both of them, the overlay traffic information collector 100 can decide that probe information has passed through an overlay network communication path passing through the overlay traffic information collector 100.

If several overlay traffic information collectors 100 observe variations in these traffic profiles in the search (probe) information in-transmission state, the variations in the traffic profile in the probe information in-transmission state in the nearest of these overlay traffic information collectors 100 to the source personal computer PC90 are noted, and a search is made to find another overlay traffic information collector 100 that observed similar variations. If such an overlay traffic information collector 100 is found, the overlay network communication path can be traced through it to another point in the network, more distant from personal computer PC90. This process can be continued to trace the entire transfer path the probe information takes from personal computer PC90 to personal computer PC91.

Such use of nodes with personal computers on which the probe information transmitter-receiver 200 is installed enables overlay network nodes to be detected and their communication paths to be identified with high accuracy, because the flow of known data intentionally launched into the network at known times can be traced, without the need to infer the flow indirectly.

The second embodiment accordingly provides all the effects of the first embodiment, but permits more accurate detection of overlay network traffic.

Third Embodiment

The overlay traffic detection system and monitoring and control system in the third embodiment will now be described.

Figure 10:
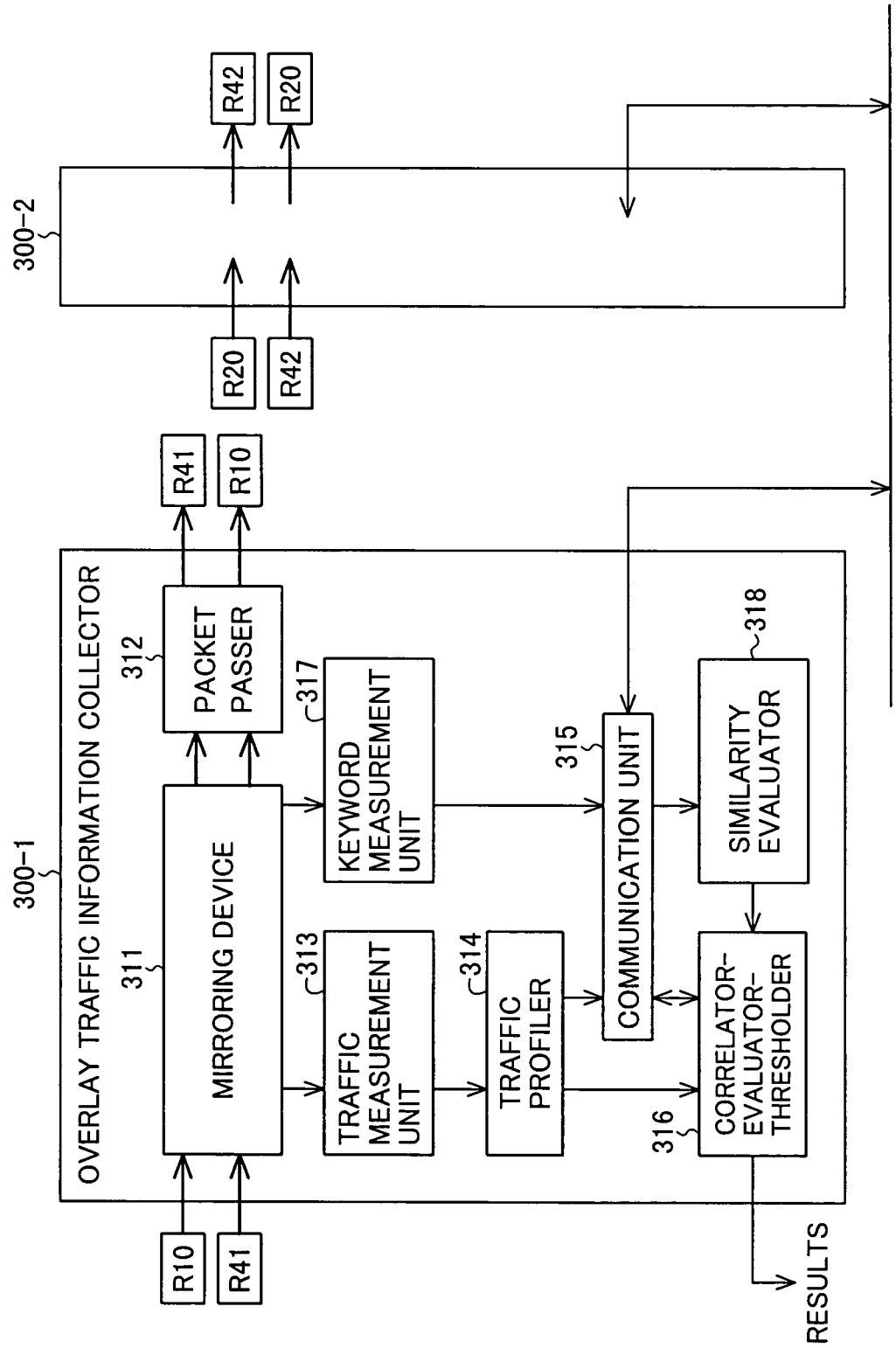
FIG. 10 is a block diagram illustrating the general plan of the overlay traffic detection system and the internal structure of one of its overlay traffic information collectors in a third embodiment.

Referring to FIG. 10, the third embodiment replaces the overlay traffic information collectors used in the first and second embodiments with enhanced overlay traffic information collectors 300. FIG. 10 shows two enhanced overlay traffic information collectors 300-1, 300-2. Overlay traffic information collector 300-1 includes a mirroring device 311, packet passer 312, traffic measurement unit 313, traffic profiler 314, communication unit 315, and correlator-evaluator-thresholder 316, which are generally similar to the corresponding elements in the overlay traffic information collector 100-1 in FIG. 3, and also includes a keyword measurement unit 317 and a similarity evaluator 318. Overlay traffic information collector 300-2 has a generally similar internal structure (not shown), including the keyword measurement unit and possibly the similarity evaluator.

The following description will focus on the keyword measurement unit 317 and similarity evaluator 318. An arbitrary overlay traffic information collector (traffic information collector 300-1 or 300-2, or another similar traffic information collector not shown in FIG. 10) will be referred to as traffic information collector 300.

The keyword measurement unit 317 receives a packet from the mirroring device 311, searches the data in the packet for keywords that may be related to overlay network traffic, measures the frequency of occurrence of each keyword, and exchanges keyword occurrence frequency information with other overlay traffic information collectors 300 via the communication unit 315.

The similarity evaluator 318 obtains a keyword occurrence frequency distribution from the keyword occurrence frequency information measured in the overlay traffic information collectors 300, including its own apparatus, and evaluates the similarity of the keyword occurrence frequency distribution, thereby detecting overlay network traffic and identifying its flow paths.

The keyword evaluation feature of the third embodiment can be added to the overlay network traffic detection systems in both the first and second embodiments.

The operation of detecting overlay network traffic in the third embodiment will be described below.

In the third embodiment, the existence of overlay network traffic and its paths are inferred based on the assumption that a keyword included in the data that an overlay network node transmits in plaintext as non-overlay network traffic is associated with the overlay network to which the node belongs.

In an overlay messaging service network accessed by the general public, for example, there may be two nodes (users) connected to the network that often access a certain site (e.g., a search engine site or a map site) at about the same time by using the same keyword. In this case, it can be inferred that the two nodes are communicating about a common topic involving the keyword through the (encrypted) overlay messaging service, and are accessing the above site by using a regular plaintext Internet service to obtain further information about the topic.

To make inferences based on this assumption, traffic input to the mirroring device 311 of the overlay traffic information collector 300 is sent to the traffic measurement unit 313 as in the first and second embodiments and also to the keyword measurement unit 317. The keyword measurement unit 317 measures the occurrence frequency of plaintext keywords from the inbound traffic.

The keywords to be measured may be stored in a database, for example. General electronic dictionaries (e.g. MICROSOFT Bookshelf and the Daijirin Japanese dictionary) tend to include about 250 thousand words; this number of words will generally suffice.

The measurement of keyword occurrence frequency can be implemented by software, but it is more advantageous in turns of execution speed to carry out a concurrent AND search on the bit trains of the traffic flows by using a network processor, DSP, or other specialized hardware.

Time-series keyword occurrence information obtained by the keyword measurement unit 317 is exchanged with other overlay traffic information collectors 300 via the communication unit 315.

Based on the time-series keyword occurrence information measured by its own and other overlay traffic information collectors 300, the similarity evaluator 318 obtains keyword occurrence frequency distributions and evaluates their similarity.

The similarity of keyword occurrence frequency distributions can be calculated by treating a keyword occurrence frequency distribution as an N-dimensional vector, where N is the number of keywords, and calculating inner products of such vectors. The distributions are preferably restricted to keywords with low occurrence frequencies by excluding keywords that have high occurrence frequencies at all nodes.

The calculated similarity value of a pair of keyword occurrence frequency distributions is transferred to the correlator-evaluator-thresholder 316 to be used in a threshold decision.

The third embodiment enhances the effects of the first and second embodiments by providing further evidence that can be used to identify mutually communicating overlay network nodes.

The first to third embodiments have been described in terms of physical devices, each overlay traffic information collector being a separate physical unit.

However, the functions performed by the overlay traffic information collector may be implemented in existing types of network devices such as routers and switches by installing the necessary hardware and software. Existing facilities such as traffic information measurement facilities, communication facilities, and traffic input facilities provided for other purposes in the routers and switches may then be used for the purposes described above. The decision results output from the correlator-evaluator-thresholders in the preceding embodiments may be output as part of, for example, a router's management information base (MIB), or as console output.

Those skilled in the art will recognize that further variations are possible within the scope of the invention, which is defined in the appended claims.

What is claimed is:

1. An overlay network traffic detection system, comprising:
   a plurality of data processing apparatuses that are configured to provide a plurality of traffic measurement units that are deployed on a network to receive network traffic in transit on the network and obtain statistical information about traffic flow on the network;
   a plurality of traffic profilers for creating traffic profiles based on the statistical information measured by the traffic measurement units; and
   a correlator-evaluator-thresholder for collecting and additively compiling the traffic profiles obtained by the plurality of traffic profilers, calculating an inbound-outbound correlation level between the compiled traffic profile of traffic inbound to a destination and the compiled traffic profile of outbound traffic originating from the destination, and deciding whether the inbound-outbound correlation level exceeds a first threshold value,
   wherein each of the plurality of traffic profilers performs a frequency component analysis of a combination of two or more of packet length distribution, packet arrival time spacing distribution, and traffic volume distribution in a plurality of time intervals,
   wherein the correlator-evaluator-thresholder decides whether a node in the network is an overlay network node or not by testing for similarity between results of frequency component analyses of the node's inbound traffic and the node's outbound traffic,
   wherein the correlator-evaluator-thresholder tests for similarity by comparing a shape of a spectrum of the node's inbound traffic and a shape of a spectrum of the node's outbound traffic, and
   wherein the correlator-evaluator-thresholder tests for similarity by comparing a curved surface representing the spectrum of the node's inbound traffic with a curved surface representing the spectrum of the node's outbound traffic in a three-dimensional Cartesian coordinate system with axes representing frequency, magnitude, and time.

2. An overlay network traffic detection system, comprising:
   a plurality of data processing apparatuses that are configured to provide a plurality of traffic measurement units that are deployed on a network to receive network traffic in transit on the network and obtain statistical information about traffic flow on the network;
   a plurality of traffic profilers for creating traffic profiles based on the statistical information measured by the traffic measurement units; and
   a correlator-evaluator-thresholder for collecting and additively compiling the traffic profiles obtained by the plurality of traffic profilers, calculating an inbound-outbound correlation level between the compiled traffic profile of traffic inbound to a destination and the compiled traffic profile of outbound traffic originating from the destination, and deciding whether the inbound-outbound correlation level exceeds a first threshold value,
   wherein each of the plurality of traffic profilers performs a frequency component analysis of a combination of two or more of packet length distribution, packet arrival time spacing distribution, and traffic volume distribution in a plurality of time intervals,
   wherein the correlator-evaluator-thresholder decides whether a node in the network is an overlay network node or not by testing for similarity between results of frequency component analyses of the node's inbound traffic and the node's outbound traffic,
   wherein the overlay network traffic detection system further comprises a packet passer for adding artifacts to the network traffic by a process including at least one of delaying packets, selectively dropping packets, and generating bit errors in packets, wherein the correlator-evaluator-thresholder also identifies overlay network communication paths by identifying effects caused by the artifacts, and
   wherein one of the effects identified by the correlator-evaluator-thresholder is a period of zero outbound traffic from a node in the network lasting for a shorter time than required by communication protocol control.

3. An overlay network traffic detection system, comprising:
   a plurality of data processing apparatuses that are configured to provide a plurality of traffic measurement units that are deployed on a network to receive network traffic in transit on the network and obtain statistical information about traffic flow on the network;
   a plurality of traffic profilers for creating traffic profiles based on the statistical information measured by the traffic measurement units; and
   a correlator-evaluator-thresholder for collecting and additively compiling the traffic profiles obtained by the plurality of traffic profilers, calculating an inbound-outbound correlation level between the compiled traffic profile of traffic inbound to a destination and the compiled traffic profile of outbound traffic originating from the destination, and deciding whether the inbound-outbound correlation level exceeds a first threshold value,
   wherein each of the plurality of traffic profilers performs a frequency component analysis of a combination of two or more of packet length distribution, packet arrival time spacing distribution, and traffic volume distribution in a plurality of time intervals,
   wherein the correlator-evaluator-thresholder decides whether a node in the network is an overlay network node or not by testing for similarity between results of frequency component analyses of the node's inbound traffic and the node's outbound traffic,
   wherein the overlay network traffic detection system further comprises a packet passer for adding artifacts to the network traffic by a process including at least one of delaying packets, selectively dropping packets, and generating bit errors in packets, wherein the correlator-evaluator-thresholder also identifies overlay network communication paths by identifying effects caused by the artifacts,
   wherein the packet passer blocks all but one inbound traffic flow into a node in the network, and
   wherein the correlator-evaluator-thresholder calculates a correlation between a traffic profile of the one inbound traffic flow and a traffic profile of a resulting output traffic flow from the node, and identifies the one inbound traffic flow and the resulting output traffic flow as flows on an overlay network communication path if the calculated correlation exceeds a third threshold value.

4. An overlay network traffic detection system, comprising:
- a plurality of data processing apparatuses that are configured to provide a plurality of traffic measurement units that are deployed on a network to receive network traffic in transit on the network and obtain statistical information about traffic flow on the network;
- a plurality of traffic profilers for creating traffic profiles based on the statistical information measured by the traffic measurement units; and
- a correlator-evaluator-thresholder for collecting and additively compiling the traffic profiles obtained by the plurality of traffic profilers, calculating an inbound-outbound correlation level between the compiled traffic profile of traffic inbound to a destination and the compiled traffic profile of outbound traffic originating from the destination, and deciding whether the inbound-outbound correlation level exceeds a first threshold value,
- wherein each of the plurality of traffic profilers performs a frequency component analysis of a combination of two or more of packet length distribution, packet arrival time spacing distribution, and traffic volume distribution in a plurality of time intervals,
- wherein the correlator-evaluator-thresholder decides whether a node in the network is an overlay network node or not by testing for similarity between results of frequency component analyses of the node's inbound traffic and the node's outbound traffic,
- wherein the overlay network traffic detection system further comprises a packet passer for adding artifacts to the network traffic by a process including at least one of delaying packets, selectively dropping packets, and generating bit errors in packets, wherein the correlator-evaluator-thresholder also identifies overlay network communication paths by identifying effects caused by the artifacts,
- wherein the packet passer adds the artifacts to only to one inbound traffic flow addressed to a node in the network, and
- wherein the correlator-evaluator-thresholder calculates a correlation between a traffic profile of the one inbound traffic flow and a traffic profile of a resulting output traffic flow from the node, and identifies the one inbound traffic flow and the resulting output traffic flow as flows on an overlay network communication path if the calculated correlation exceeds a fourth threshold value.

5. An overlay network traffic detection system, comprising:
- a plurality of data processing apparatuses that are configured to provide a plurality of traffic measurement units that are deployed on a network to receive network traffic in transit on the network and obtain statistical information about traffic flow on the network;
- a plurality of traffic profilers for creating traffic profiles based on the statistical information measured by the traffic measurement units; and
- a correlator-evaluator-thresholder for collecting and additively compiling the traffic profiles obtained by the plurality of traffic profilers, calculating an inbound-outbound correlation level between the compiled traffic profile of traffic inbound to a destination and the compiled traffic profile of outbound traffic originating from the destination, and deciding whether the inbound-outbound correlation level exceeds a first threshold value,
- wherein each of the plurality of traffic profilers performs a frequency component analysis of a combination of two or more of packet length distribution, packet arrival time spacing distribution, and traffic volume distribution in a plurality of time intervals,
- wherein the correlator-evaluator-thresholder decides whether a node in the network is an overlay network node or not by testing for similarity between results of frequency component analyses of the node's inbound traffic and the node's outbound traffic,
- wherein the overlay network traffic detection system further comprises a probe information transmitter-receiver capable of joining an overlay network and transmitting and receiving probe information used to search for data on the overlay network,
- wherein the plurality of traffic measurement units measure statistical information about traffic flows related to the probe information,
- wherein the plurality of traffic profilers obtain traffic profiles before, while, and after the probe information transmitter-receiver transmits the probe information, and
- wherein the correlator-evaluator-thresholder, calculates correlations among the traffic profiles obtained before, when, and after the probe information transmitter-receiver transmits the probe information, and identifies traffic profiled before, when, and after the probe information transmitter-receiver transmits the probe information as overlay network traffic if its inbound-outbound correlation level is less than a fifth threshold value before and after the probe information transmitter-receiver transmits the probe information and is greater than a sixth threshold value when the probe information transmitter-receiver transmits the probe information.

6. The overlay network traffic detection system of claim 5, wherein the correlator-evaluator-thresholder traces the overlay network traffic sequentially backward from the probe information transmitter-receiver.

7. The overlay network traffic detection system of claim 1, wherein at least one of the data processing apparatuses is a computer.

8. The overlay network traffic detection system of claim 1, wherein at least one of the data processing apparatuses is router.

9. The overlay network traffic detection system of claim 5, wherein at least one of the data processing apparatuses is a computer.

10. The overlay network traffic detection system of claim 5, wherein at least one of the data processing apparatuses is router.

* * * * *